United States Patent [19]
Hehl

[11] 3,804,003
[45] Apr. 16, 1974

[54] COVERED DIE CLOSING UNIT FOR INJECTION MOLDING MACHINES

[76] Inventor: Karl Hehl, Siedlung 173, Wurtt., Germany

[22] Filed: Sept. 8, 1972

[21] Appl. No.: 287,244

[30] Foreign Application Priority Data
Sept. 15, 1971 Germany.............................. 2146042

[52] U.S. Cl.................................. 100/53, 425/152
[51] Int. Cl........................... B29f 1/00, B30b 15/04
[58] Field of Search ...... 100/53; 425/136, 151, 152, 425/450

[56] References Cited
UNITED STATES PATENTS
2,415,462  2/1947  Cherry et al.................. 100/53 UX
3,104,607  9/1963  Galas................................... 100/53
3,728,057  4/1973  Grundmann et al............ 425/151 X Primary Examiner—Peter Feldman
Assistant Examiner—Philip R. Coe
Attorney, Agent, or Firm—Joseph A. Geiper

[57] ABSTRACT

A covered die closing unit for injection molding machines in which the die supports are covered by a die cover and the remaining parts of the unit are covered by an end cover, the two covers being telescopically movable relative to one another along common guide rods. The unit may also include electrical and hydraulic safety interlocks and may further include a pneumatic drive for the opening and closing motions of the covers.

16 Claims, 12 Drawing Figures

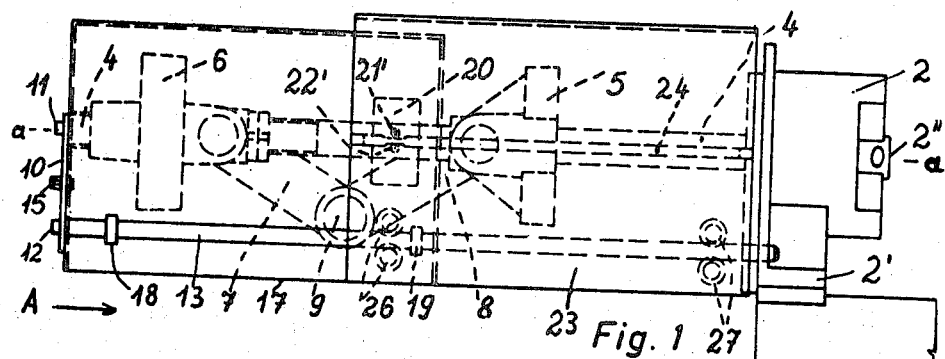
Fig. 1
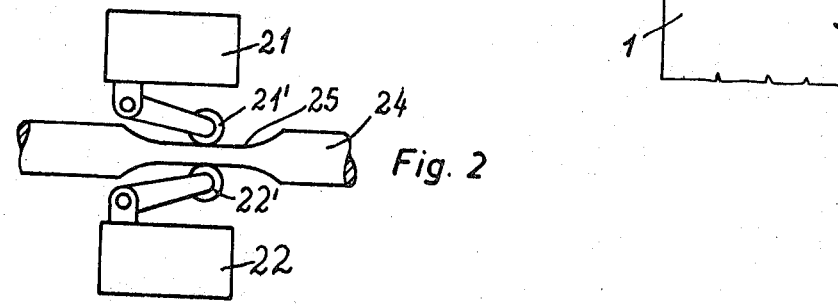
Fig. 2
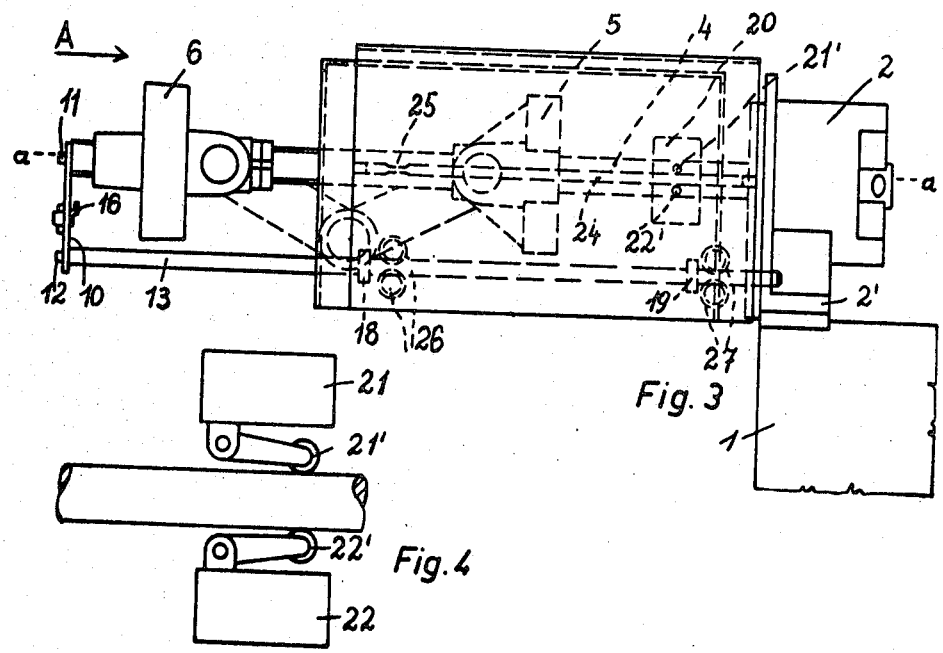
Fig. 3
Fig. 4

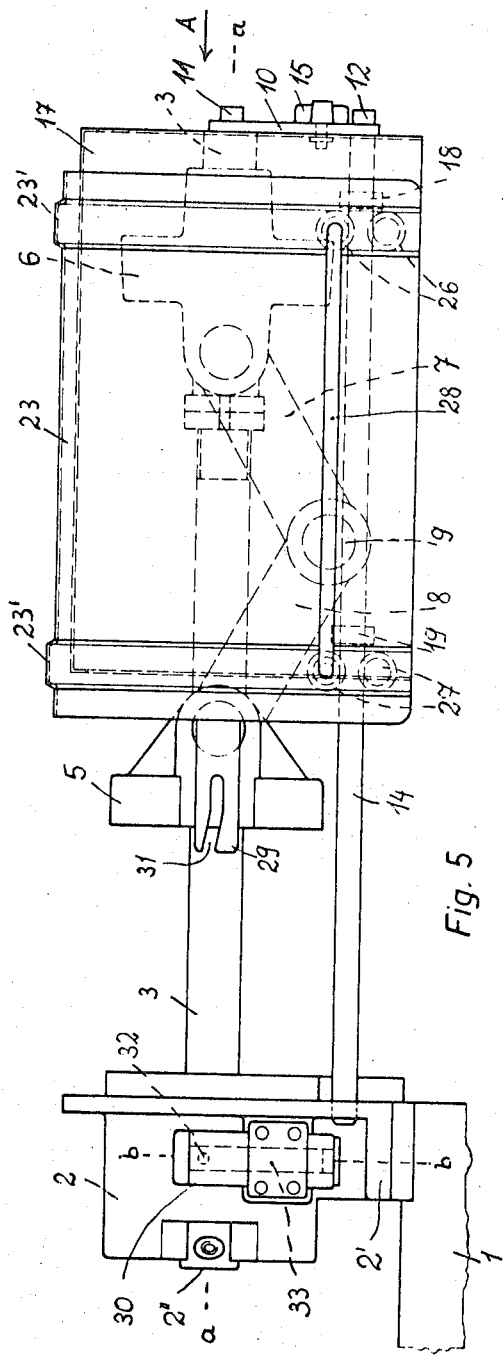
Fig. 5
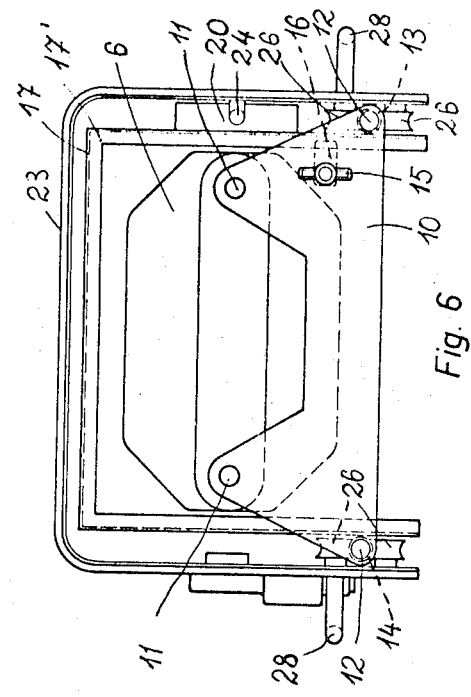
Fig. 6
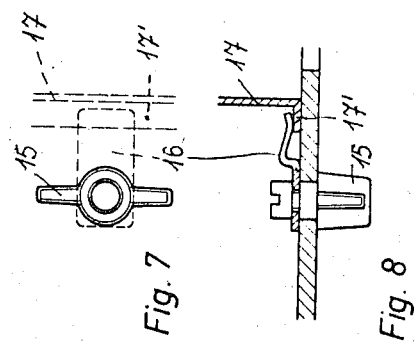
Fig. 7
Fig. 8

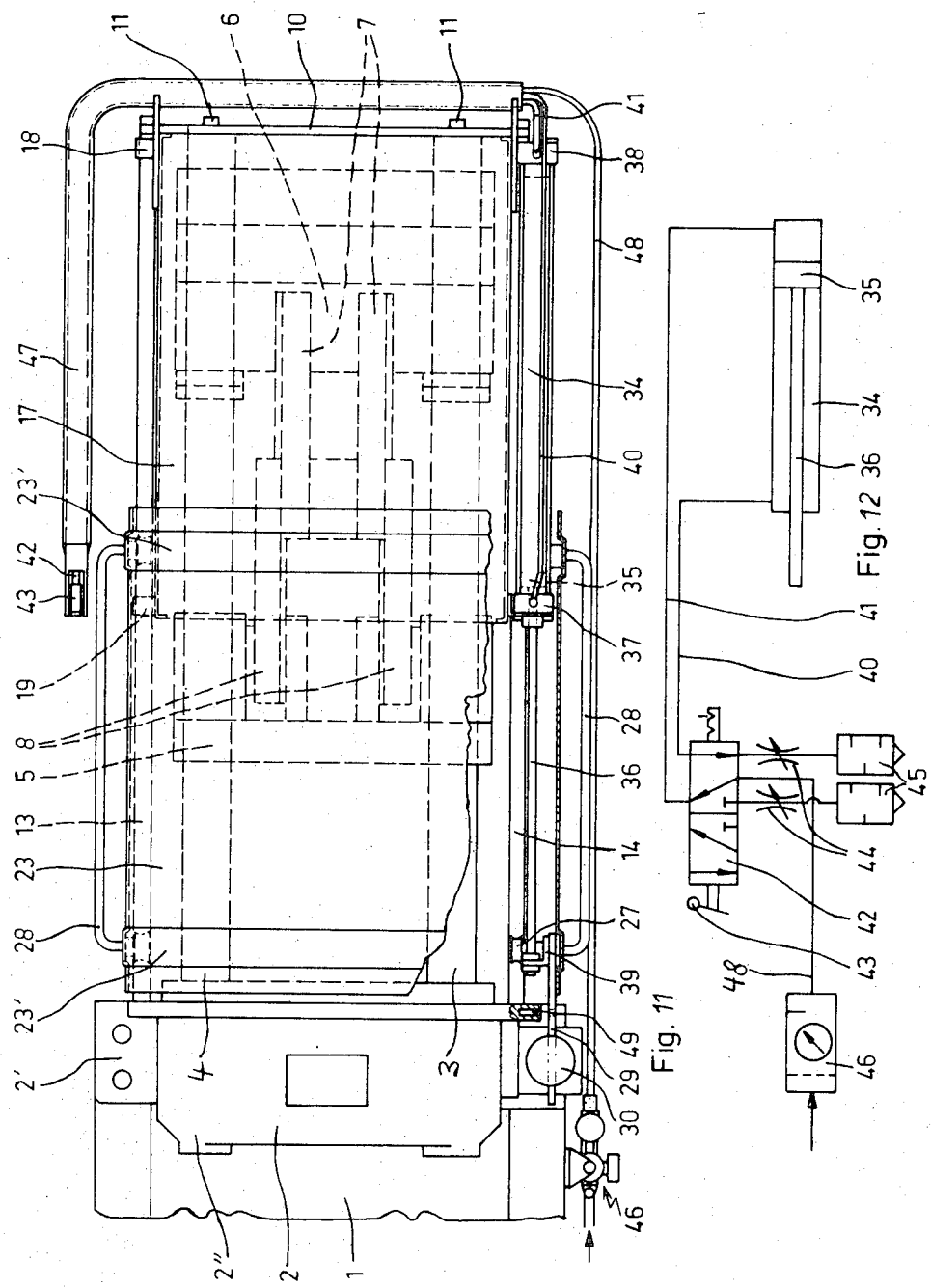

COVERED DIE CLOSING UNIT FOR INJECTION MOLDING MACHINES

BACKGROUND OF THE INVENTION

1. Field of the Invention

The invention relates to die closing units for injection molding machines, and in particular to die closing units which are equipped with safety covers for the injection molding die which, when opened, block the operation of the injection molding machine.

2. Description of the Prior Art

In the German Offenlegungsschrift No. 1,529,778 is disclosed a die closing unit for an injection molding machine which has a stationary end cover. A change of die in this case requires that all covers of the die closing unit have to be removed. This operation is time consuming and awkward.

SUMMARY OF THE INVENTION

It is a primary objective of the present invention to propose a covered die closing unit of the earlier mentioned type which permits changing of the die and access to the die closing unit, i.e., access to the die area on the one hand and to the drive components on the other hand, in a more simple and less effort and time consuming manner.

The invention proposes to attain this objective by suggesting a die closing unit of the earlier mentioned type in which the end cover is telescopically movable out of its normal position so as to slide under the die cover when the latter is in its normal position, and in which the die cover is similarly telescopically movable out of its normal position to slide over the end cover, when the latter is in its normal position.

The die cover and the end cover are preferably U-shaped in cross section and longitudinally movable along common guide rods. In their normal positions, the two covers preferably form a partial overlap with each other.

The guidance of both covers by means of common guide rods is made possible by the fact that the connecting elements which guide one of the covers (e.g., the die cover) on the guide rod are cooperating pairs of rollers, and the connecting elements of the other cover (e.g., the end cover) with the same guide rods are eye brackets. The roller pairs and eye brackets are preferably so arranged that one of the roller pairs is positioned between the two eye brackets and that one of the eye brackets is positioned between the two roller pairs.

A locking device which is operative in the normal position of the end cover prevents the possibility that it may be opened inadvertently or accidentally shifted out of place by a movement which was not intended to remove the end cover. This locking device is mounted on an end plate which is carried by the supporting arms of the die closing unit and which in turn supports one end of the guide rods.

The die closing unit of the invention may further include a pneumatically operable, manually controlled drive cylinder which is attached to the end cover. Such a pneumatic cylinder serves for the move-ment of the die cover into and out of its normal position.

BRIEF DESCRIPTION OF THE DRAWINGS

Further special features and advantages of the invention will become apparent from the description following below, when taken together with the accompanying drawings which illustrate, by way of example, several embodiments of the invention, represented in the various figures as follows:

FIG. 1 shows in a front elevational view a covered die closing unit embodying the invention, the covers being shown in their closed positions on the die closing unit;

FIG. 2 shows an enlarged detail of FIG. 1 showing portions of the electrical safety switch;

FIG. 3 shows the die closing unit of FIG. 1 with the die cover in its closed position and the end cover shifted out of its closed position;

FIG. 4 shows the safety switch details of FIG. 2 in a position which corresponds to FIG. 3;

FIG. 5 shows a rear elevational view of the die closing unit of FIGS. 1 and 3, the end cover being shown in its closed position and the die cover being shifted out of its closed position;

FIG. 6 is a side elevational view of the die closing unit of FIGS. 1, 3 and 5 seen along arrow A;

FIG. 7 shows an enlarged detail of FIG. 6;

FIG. 8 shows the detail of FIG. 6 in a cross sectional plan view;

FIG. 11 is a plan view of the die closing unit of FIGS. 9 and 10; and

FIG. 12 is a schematic control diagram for the pneumatic operation of the die cover drive of the embodiment of FIGS. 9–11.

DESCRIPTION OF THE PREFERRED EMBODIMENTS

Figures 9, 10:
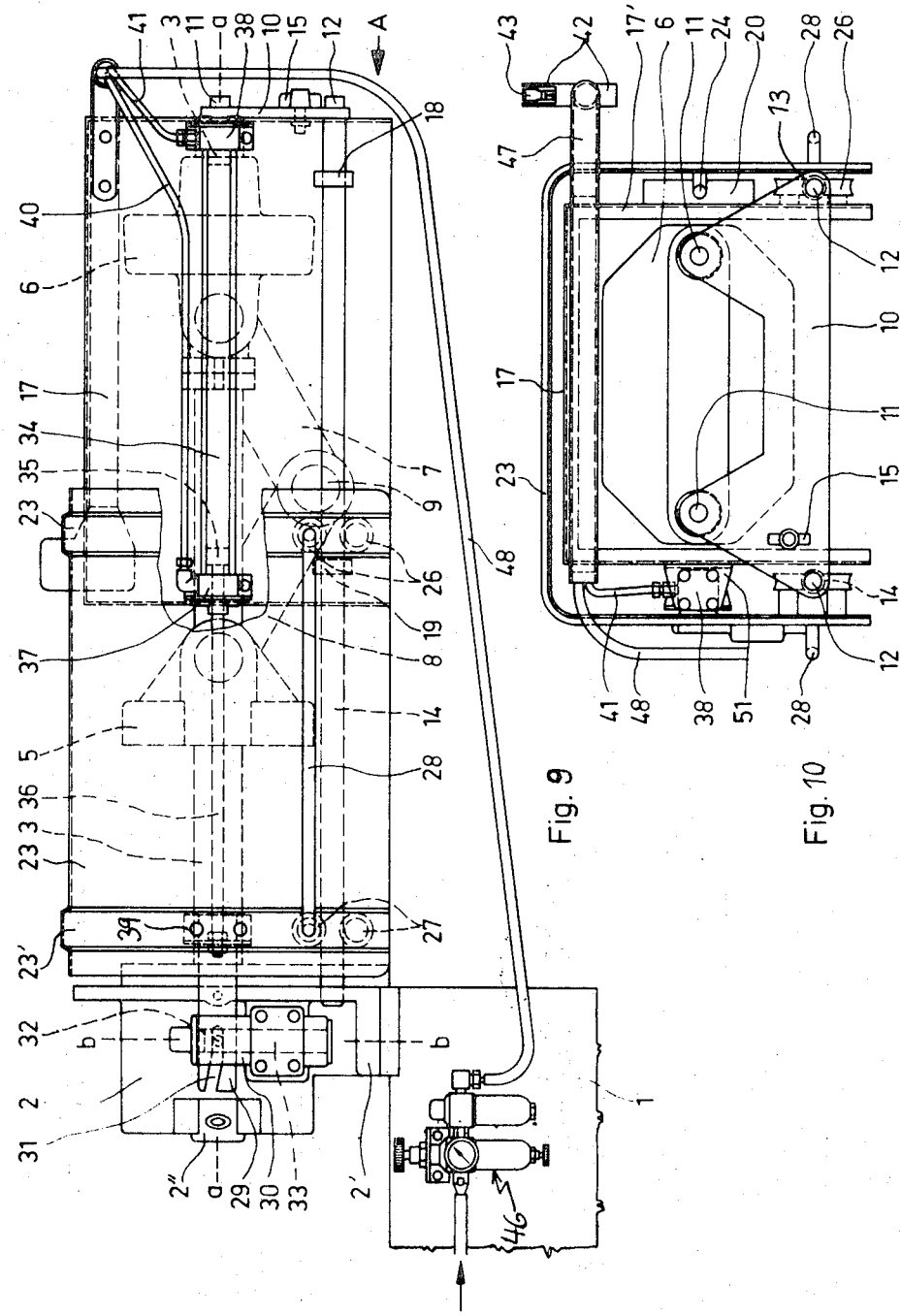
FIG. 9 shows in a rear elevational view similar to that of FIG. 5 a second embodiment of the invention which includes a pneumatic die cover drive and which shows both covers in their closed positions.
FIG. 10 is an elevational side view of the die closing unit of FIG. 9.

The die closing unit of the invention is intended for use in conjunction with an injection molding machine. FIG. 1 shows a portion of the frame 1 of such an injection molding machine which carries a stationary die support 2, mounted to frame 1 by means of a mounting flange 2'. The stationary die support 2 includes mounting sleeves 2'' which serve for the centered positioning and attachment of an injection unit (not shown) whose injection axis is perpendicular to the separation plane of the die. Facing the stationary die support 2 within the die closing unit is a movable die support 5 which is arranged for reciprocation toward and away from die support 2 and guided by a pair of supporting arms 3 and 4. Between them the two die supports carry the stationary and mobile die halves, respectively. The latter are omitted in the drawing. The support arms 3 and 4 are rigidly mounted and supported relative to the machine frame 1. The movable die support 5 receives its reciprocating motion from a hydraulic cylinder (not shown) which is connected to the former by means of a knee linkage 7, 8, the piston rod of the hydraulic cylinder engaging the joint 9 of the knee linkage 7, 8. The latter, when being stretched, closes the die by moving die support 5 toward die support 2 and, when being bent, opens the die by moving die support 5 away from die support 2.

Link 7 of the knee linkage 7, 8 is connected on one end to the knee joint 9 and on its other end to a stationary anchor block 6. Link 8 is similarly connected to joint 9, while its opposite end is connected to the movable die support 5. The anchor block 6 is fastened to the support arms 3 and 4 and longitudinally adjustable relative thereto. Its position has to be adjusted whenever one die is replaced by another die of a different overall thickness.

At the outer end of the support arms 3 and 4 is arranged an end plate 10 which is mounted thereto by means of screws 11. Between this end plate 10 and the mounting flange 2' of the stationary die support 2 are further arranged, in a symmetric, parallel relation to the center axis a-a of the die closing unit, two guide rods 13 and 14. On these guide rods are supported two longitudinally movable covers, viz. a die cover 23 and an end cover 17, both having a generally U-shaped cross sectional outline. The die cover 23 substantially encloses the stationary die support 2 and movable die support 5 with their die halves, while the end cover 17 substantially encloses the knee linkage and the anchor block.

Where the basic die closing unit employed is of a different design, for instance, when the movable die support is directly mounted on the piston rods of the hydraulic cylinders which provide the closing motion and closing pressure, the machine portion covered by the end cover may be that which contains the motion range of the movable die support.

The end plate 10 of the die closing unit carries a locking device 15, 16 which includes a manually rotatable wing bolt 15 and a latch 16 which is positioned by the wing bolt 15. In the locked position, latch 16 engages a ledge 17' which extends inwardly from the outer edge of cover 17. The end cover 17 is guided on the guide rods 13 and 14 by means of eye brackets 18 and 19 which are provided on each side of cover 17. The latter can be opened by longitudinally sliding it along guide rods 13 and 14 in the closing direction of the die closing unit. The die cover 23 can similarly be opened by longitudinally sliding it along the guide rods 13 and 14 in the opening direction of the die closing unit. In order to accommodate the opening motions of the two covers 17 and 23, they are arranged to slide telescopically into one another, as can be seen from FIGS. 3 and 5. For this purpose, the U-shaped profile of end cover 17 is made somewhat smaller than the similarly U-shaped profile of die cover 23. A small overlap between the two covers remains, even when both covers are in their closed positions.

The die cover 23, as mentioned earlier, is guided on the same guide rods 13 and 14 as the die cover 17. For this purpose, die cover 23 has two pairs of rollers 26 and 27 on each side which engage the rods 13 and 14, respectively. The two covers and their respective eye brackets 18, 19 and roller pairs 26, 27 are so arranged that, in any longitudinal cover position, the eye bracket 19 is positioned between the roller pairs 26 and 27 and the roller pair 26 in turn is positioned between the eye brackets 18 and 19. The cooperating eye brackets and roller pairs, respectively, are longitudinally spaced from one another a sufficient distance to permit the complete opening of either the end cover 17 under the closed position of die cover 23, (FIG. 3) or the complete opening of the die cover 23 over the closed position of end cover 17 (FIG. 5). In both open positions the eye brackets 18 and 19 come to be positioned adjacent to the roller pairs 26 and 27.

The die closing unit preferably also includes an electrical safety device whose purpose is to interrupt the electrical main circuit of the die closing unit, whenever one of the two covers is moved out of its closed position. This electrical safety interlock includes a control rod 24 which is arranged solidary with the die cover 23 in the space between the smaller U-profile of end cover 17 and the larger U-prifile of die cover 23. The control rod cooperates with microswitches 21 and 22 which are mounted in the same space on the outside wall of end cover 17. Oppositely arranged cam portions 25 and control rod 24 are engaged by switch rollers 21' and 22' arranged at the end of the contact levers of microswitches 21 and 22. The latter are covered by a switch housing 20.

A preferred embodiment of the invention also includes a device which serves to block the hydraulic circuit of the die closing unit, whenever the die cover is removed from its closed position. This hydraulic safety device includes a control lever 29 which is mounted on the die cover 23 and which cooperates with a shutoff valve unit 30, 32, 33 which is fixedly mounted on the stationary die support 2. Control lever 29 on the die cover has a cam slot 31 which is inclined relative to the axis $a-a$ of the die closing unit. The valve body 33 of the shutoff valve 30 includes a control pin 32 which cooperates with the cam slot 31 of the control lever so that, when the die cover 23 is moved into its closed position, the cam slot 31 moves the control pin of valve 30 along the valve axis $b-b$, whereby the shutoff valve is opened. Inversely, the shutoff valve 30 is closed by the action of the control lever 29 as soon as die cover 23 is moved out of its closed position. Valve 30, when closed, blocks the hydraulic circuit of the die closing unit.

The cover arrangement as suggested by the invention makes it possible to selectively expose for access either the area of the dies and die supports, or the area of the knee linkage 7, 8, 9. The provision of the electrical safety interlock assures that, whenever either one of covers 23 or 17 is moved out of its closed position, the electrical main circuit of the die closing unit is interrupted. As mentioned earlier, this result is obtained by means of the control rollers 21' and 22' of the microswitches 21 and 22 which, by moving away from the cam portion 25 of control rod 24, open the safety switches 21 and 22. Thus, the main circuit is only then closable, when both covers are in their fully closed positions, in which case the electrical safety interlock is positioned as shown in FIG. 2 of the drawing.

The hydraulic circuit of the die closing unit is only then interrupted, when the die cover 23 is shifted from its closed position. Opening of the end cover 17, in contrast, does not block the hydraulic circuit. Thus, the hydraulics of the die closing unit can be operated, even when end cover 17 is fully retracted as shown in FIG. 3. In this case, however, the electrical main circuit has been interrupted, but the operator still has a possibility to operate the machine, by actuating a special shunt switch in the main circuit which by-passes the electrical safety interlock. This arrangement permits the operation of the die closing unit for testing and adjustment purposes, for example, when the anchor block 6 has to be longitudinally adjusted in connection with a change in molding dies.

Another preferred embodiment of the invention is illustrated in FIGS. 9–12, and its suggested design is as follows:

The end cover 17 of the die closing unit carries on one of its side walls a pneumatic drive cylinder assembly 34–38. This drive assembly consists essentially of a pneumatic cylinder 34, two cylinder ends 37 and 38, a piston 35, and a piston rod 36 whose free end is connected to a bracket 39 on the adjacent side wall of die cover 23.

The drive cylinder assembly is supplied with compressed air via an air control unit 46 which includes, among other things, a pressure regulator, a water separator, a shutoff valve, and an oil mist unit. An air connection 48 leads the compressed air to a valve 42 which is manually operable by means of lever 43, valve 42 being conveniently arranged on the operator's side of the injection molding machine. A second air connection 40 leads from valve 42 to the front portion of the cylinder, line 40 also serving as air exhaust when, during the closing motion of die cover 23 the air is exhausted from the front portion of the pneumatic cylinder.

A third air connection 41 leads from the manual three-way valve 42 to the rear portion of the pneumatic cylinder, and it likewise serves to exhaust the air from the cylinder, when the die cover 23 makes its opening motion.

The air supply connection 48 and the two input and exhaust connections 40 and 41 are enclosed by a tubular protection 47 which extends across the front end of the die closing unit and along the longitudinal portion outside end cover 17. This protection 47 serves also as a convenient grip profile during the movement of end cover 17 out of and into its closed position.

The operation of the aforementioned pneumatic controls is shown in a schematic operating diagram in FIG. 12. In it the manual control valve 42 is so arranged that the compressed air moves to the rear portion of the pneumatic cylinder via air connections 48 and 41, while the air contained in the front portion of cylinder 34 is exhausted through connection 40. The exhaust air passes through a throttle 44 and a muffler 45. In the opposite position of control valve 42, in which the valve plunger is moved from its position shown in FIG. 12 into a position to the right thereof, the compressed air passes through air connections 48 and 40 into the front portion of the pneumatic cylinder 54, the air in the rear portion of the cylinder being exhausted through connection 41 and passing likewise through a throttle 44 and muffler 45. Compressed air entering the front portion of the drive cylinder causes piston 35 and piston rod 36 to move to the right, thereby opening the die cover 23. An opposite motion of the piston and piston rod closes it again.

As can be seen from FIG. 11, the stationary die mount includes a bore 49, which is positioned in the path of control lever 29. When the die cover 23 is in its fully closed position, the control lever 29 is positioned in front of bore 49 and a similar bore in control lever 29 is lined up with bore 49. This makes it possible to insert a lock pin (not shown) into these aligned bores, thereby creating a mechanical interlock between control lever 29, mounting bracket 39 of die cover 23, and piston rod 36 in relation to the stationary die mount 2. When the die cover 23 and the piston rod 36 are thus locked to the die mount 2, and at the same time the latch 16 is released by rotating wing bolt 15 out of its locking position on ledge 17' of end cover 17, then the actuation of the pneumatic drive cylinder 34 causes end cover 17 to move out of its closed position toward die cover 23. In this case, the entry of compressed air into the front portion of cylinder 34 causes the cylinder assembly 34–38, and with it end cover 17, to move to the left, as the piston 35 and piston rod 36 are now longitudinally fixed. Inverse actuation of the pneumatic die cover drive produces a closing motion of end cover 17.

What is claimed is:

1. A covered die closing unit for injection molding machines, comprising in combination:

a stationary die support suitable for mounting on the machine frame of an injection molding machine;

a movable die support facing the stationary die support;

means for guiding the movable die support for reciprocating opening and closing motions in the axial direction of the die closing unit;

a power mechanism and power supply which create the opening and closing motions of the movable die support;

a die cover enclosing at least a major portion of the stationary die support and the movable die support;

an end cover enclosing at least a major portion of the power mechanism;

means for guiding the die cover and the end cover for opening and closing movements in the axial direction of the die closing unit; and means for retaining the two covers in their closed positions.

2. A die closing unit as defined in claim 1, wherein the two covers and their guide means are so arranged that the covers are movable relative to each other in a telescoping fashion so that each cover, when fully opened, occupies an axial position in which it is substantially superposed with the other cover.

3. A die closing unit as defined in claim 2, wherein the die cover and end cover have similarly shaped but unequally sized U-shaped cross sections which are so connected to the cover guide means that they permit the aforementioned telescopic relative motion.

4. A die closing unit as defined in claim 3, wherein the die cover has a larger U-shaped cross section than the end cover and substantially covers the latter when fully opened.

5. A die closing unit as defined in claim 2, wherein the guide means for the die cover and end cover include a pair of fixedly mounted, axially extending spaced guide rods; and each cover is provided with a means for connecting it to the guide rods, the connecting means of each cover being so arranged that they do not interfere with the axial movement of the connecting means of the other cover along the guide rods.

6. A die closing unit as defined in claim 1, further comprising:

means for interrupting the power supply to the power mechanism of the die closing unit, when one of the two covers is removed from its closed position.

7. A die closing unit as defined in claim 6, wherein the interrupting means is so arranged that it interrupts an electrical circuit whenever either of the two covers is moved from its closed position.

8. A die closing unit as defined in claim 7, wherein the interrupting means includes a switch which is mounted on one of the two covers and a switch actuating member which is mounted on the other cover; and the switch and switch actuating member cooperate in such a way that the switch is open whenever one of the covers is removed from its closed position and closed only when both covers are in their closed positions.

9. A die closing unit as defined in claim 6, wherein the interrupting means is so arranged that it interrupts a hydraulic circuit, whenever the die cover is removed from its closed position.

10. A die closing unit as defined in claim 9, wherein the interrupting means includes a hydraulic shutoff valve which is mounted on a fixed part of the die closing unit and a valve actuating lever which is mounted on the die cover; and the shutoff valve and valve actuating lever cooperate in such a way that the valve is closed whenever the die cover is removed from its closed position and open only when the die cover is in its closed position.

11. A die closing unit as defined in claim 1, wherein the guide means for the movable die support includes two axially extending support arms which are fixedly mounted with one end to the stationary die support and carry on their opposite end an end plate which in turn supports one end of the cover guide means.

12. A die closing unit as defined in claim 11, wherein the cover retaining means includes a latch on the end plate which is capable of holding the end cover in its closed position.

13. A die closing unit as defined in claim 1, further comprising:

mechanical cover drive means and a power supply for moving one cover relative to the other.

14. A die closing unit as defined in claim 13, wherein the cover drive means includes as power supply a source of compressed air and a double-acting pneumatic cylinder which is axially extending between one attachment point on the die cover and another attachment point on the end cover; and the cover retaining means includes means for selectively locking one or the other of the two covers in its closed position.

15. A die closing unit as defined in claim 14, wherein the pneumatic cylinder has its piston rod attached to the die cover and its casing attached to the end cover; and the cover drive means further includes a pneumatic control unit and a manually operably three-way valve which is positioned at a conveniently accessible place.

16. A die closing unit as defined in claim 15, wherein the cover drive further includes an air exhaust control means and separate air connections between the pneumatic control unit and the three-way valve, between the three-way valve and each end of the pneumatic cylinder, and between the three-way valve and the exhaust control means; and the aforementioned air connections are extending through a protective tubular profile which also serves as a grip profile on the end cover.

* * * * *